US007120997B2

(12) United States Patent
Islam et al.

(10) Patent No.: US 7,120,997 B2
(45) Date of Patent: Oct. 17, 2006

(54) CONNECTOR AXIAL COMPRESSION TOOL

(75) Inventors: Nahid Islam, Westmont, IL (US); Joon Lee, Bolingbrook, IL (US); David John Ball, Chicago Ridge, IL (US); Rodger Burke, Naperville, IL (US)

(73) Assignee: Andrew Corporation, Westchester, IL (US)

( * ) Notice: Subject to any disclaimer, the term of this patent is extended or adjusted under 35 U.S.C. 154(b) by 165 days.

(21) Appl. No.: 10/710,751

(22) Filed: Jul. 30, 2004

(65) Prior Publication Data

US 2006/0021216 A1 Feb. 2, 2006

(51) Int. Cl.
*B23P 19/00* (2006.01)

(52) U.S. Cl. ............................ 29/751; 29/748; 29/750; 29/758; 29/761; 29/861; 29/882

(58) Field of Classification Search .................. 29/750, 29/751, 758, 748, 753, 761, 237, 861, 882, 29/234

See application file for complete search history.

(56) References Cited

U.S. PATENT DOCUMENTS

| | | | | |
|---|---|---|---|---|
| 4,307,505 | A | 12/1981 | Jozens | |
| 4,723,434 | A * | 2/1988 | Bush | 72/409.14 |
| 4,932,091 | A | 6/1990 | Krzyzanski et al. | |
| 5,469,613 | A | 11/1995 | McMills et al. | |
| 5,647,119 | A | 7/1997 | Bourbeau et al. | |
| 5,934,136 | A * | 8/1999 | Bracher et al. | 72/397 |
| 5,934,137 | A | 8/1999 | Tarpill | |
| 5,983,489 | A | 11/1999 | Jee | |
| 6,112,404 | A * | 9/2000 | Tarpill | 29/751 |
| 6,293,004 | B1 * | 9/2001 | Holliday | 29/751 |
| 6,591,487 | B1 | 7/2003 | Chang | |
| 6,594,888 | B1 | 7/2003 | Chang | |
| 6,671,944 | B1 | 1/2004 | Holliday et al. | |
| 6,708,396 | B1 | 3/2004 | Holliday et al. | |
| 2002/0174538 | A1 | 11/2002 | Chang | |
| 2003/0051337 | A1 | 3/2003 | Holliday | |

* cited by examiner

*Primary Examiner*—A. Dexter Tugbang
*Assistant Examiner*—Tai Van Nguyen
(74) *Attorney, Agent, or Firm*—Babcock IP, LLC

(57) ABSTRACT

A connector axial compression tool having a lever end and a cable end, with a body slidably supporting a cradle in a cavity formed in the body. The cradle is slidable via a handle which pivots about the body, linked to the cradle by a lever mechanism. The cradle has a shoulder clamp adapted to mate with a connector body. Operation of the handle moves the cradle towards and away from a cable end of the cavity, against a cable clamp through which the cable may pass but against which a cable clamp sleeve of the connector abuts, axially compressing the connector to couple it to the cable. Because the shoulder clamp holds the connector body rather than pressing against the connector interface, a wide range of different connectors may be used with the same tool, without causing damage to the connector interface of the various connectors.

18 Claims, 5 Drawing Sheets

CONNECTOR AXIAL COMPRESSION TOOL

BACKGROUND OF INVENTION

1. Field of the Invention

This invention relates to a tool for installation of electrical connectors upon an electrical cable. More particularly, the invention is concerned with an axial compression tool, which accepts electrical connectors having a range of different connector interfaces.

2. Description of Related Art

There have been advancements in connectors adapted for installation by compression fit. U.S. patent application Ser. No. 10/708,278 "Axial Compression Electrical Connector" filed Feb. 20, 2003 by Islam et al, assigned to Andrew Corporation of Orland Park, Ill., as is the present invention, describes several embodiments of such connectors. Electrical connectors adapted for installation upon electrical cables by axial compression are field installable using an axial compression hand tool. The prior axial compression tools typically comprise a lever action, which actuates a chuckhead towards the connector interface of the electrical connector. The electrical cable and the electrical connector are fed through a stop against which the chuckhead actuates to axially compress the connector components together, permanently forming the electrical connection between the connector body and the electrical cable.

The prior chuckhead is adapted to engage the electrical connector at the face of the connector interface. Therefore, the prior tools are typically supplied dedicated to a specific connector type, such as Type F, and or include a range of different exchangeable chuckheads, one for each desired connector interface. Maintaining a range of different connector interface specific tools and or exchanging the chuckheads as different connector interfaces are encountered, increases installation tooling requirements and labor costs.

If there is any axial misalignment during the compression, the chuckheads may damage the inner conductor, sealing, and or insulator assemblies of the connector interface. Also, the compression force may push the inner conductor into the cable and away from the connector. This also may result in unnecessary labor and costs to repair and or replace any damaged components of the electrical connector and electrical cable assembly.

Competition within the electrical connector industry has focused attention on equipment and tooling costs, as well as time requirements for installation of electrical connectors.

Therefore, it is an object of the invention to provide an apparatus that overcomes deficiencies in the prior art.

BRIEF DESCRIPTION OF DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION

Figure 1:
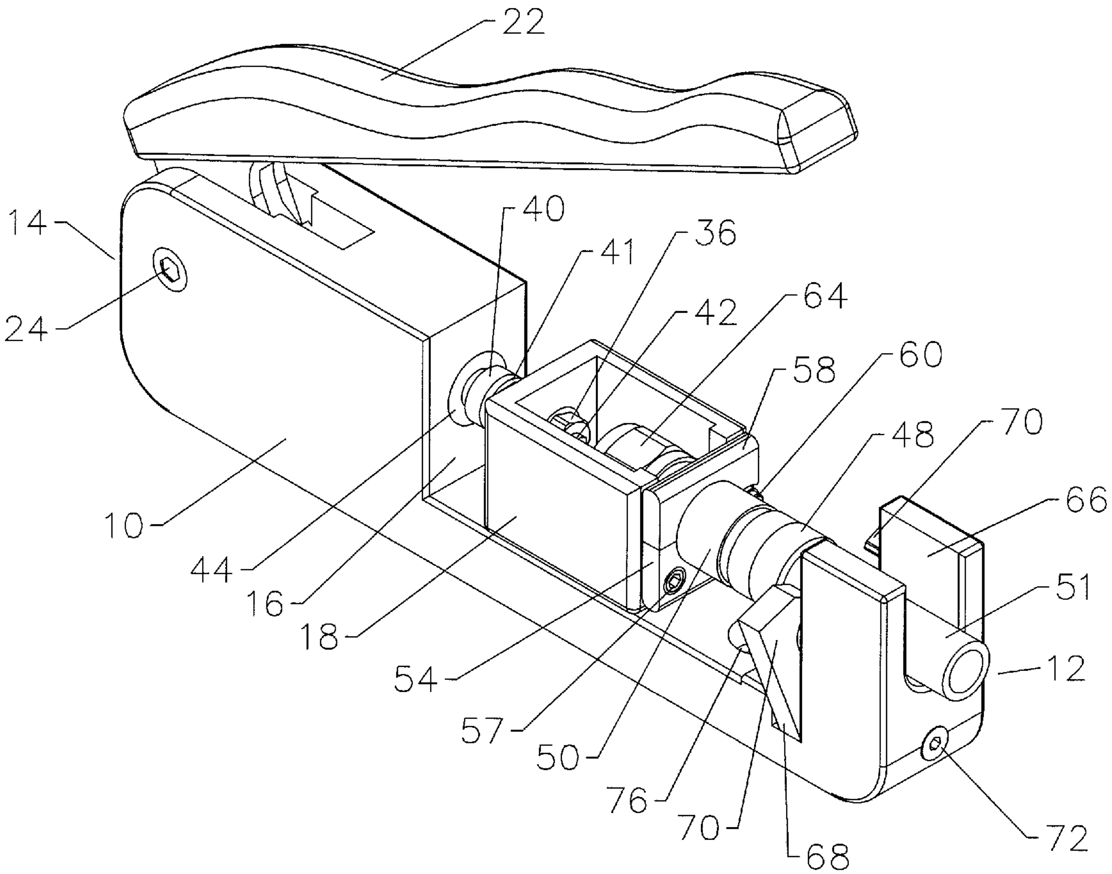
FIG. 1 is a perspective view of an axial compression tool according to one embodiment of the invention with a connector/cable assembly in place for axial compression, the cable clamp opened for clarity.

For purposes of illustration, exemplary embodiment(s) of the present invention are shown in FIGS. 1–5. As shown in FIG. 1, a body 10 comprises a cable end 12 and a lever end 14. On the body 10 and towards the cable end 12 there is an open cavity 16 adapted to receive an axially movable cradle 18.

Figure 2:
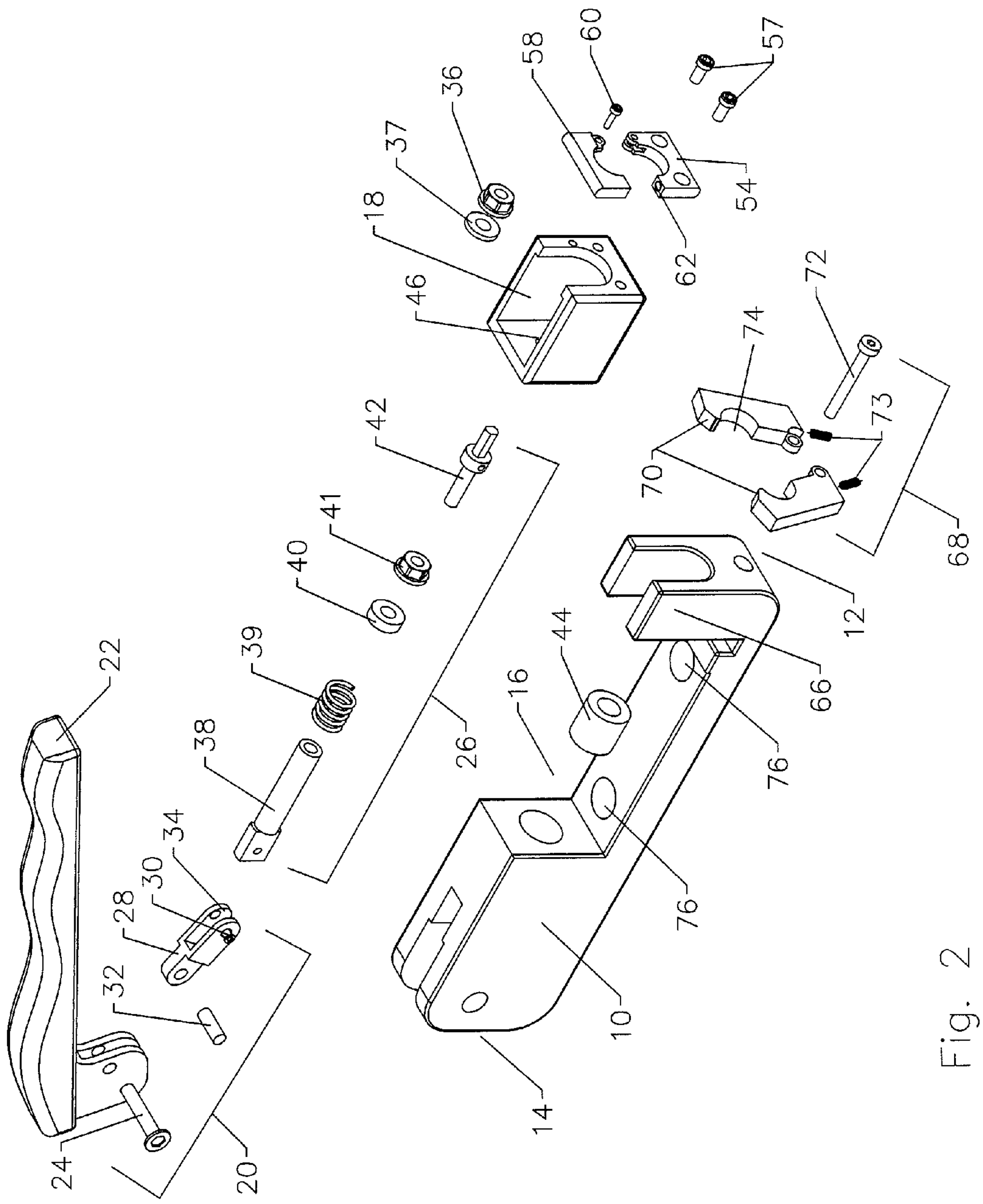
FIG. 2 is an exploded, perspective view of the axial compression tool shown in FIG. 1.
Figure 3:
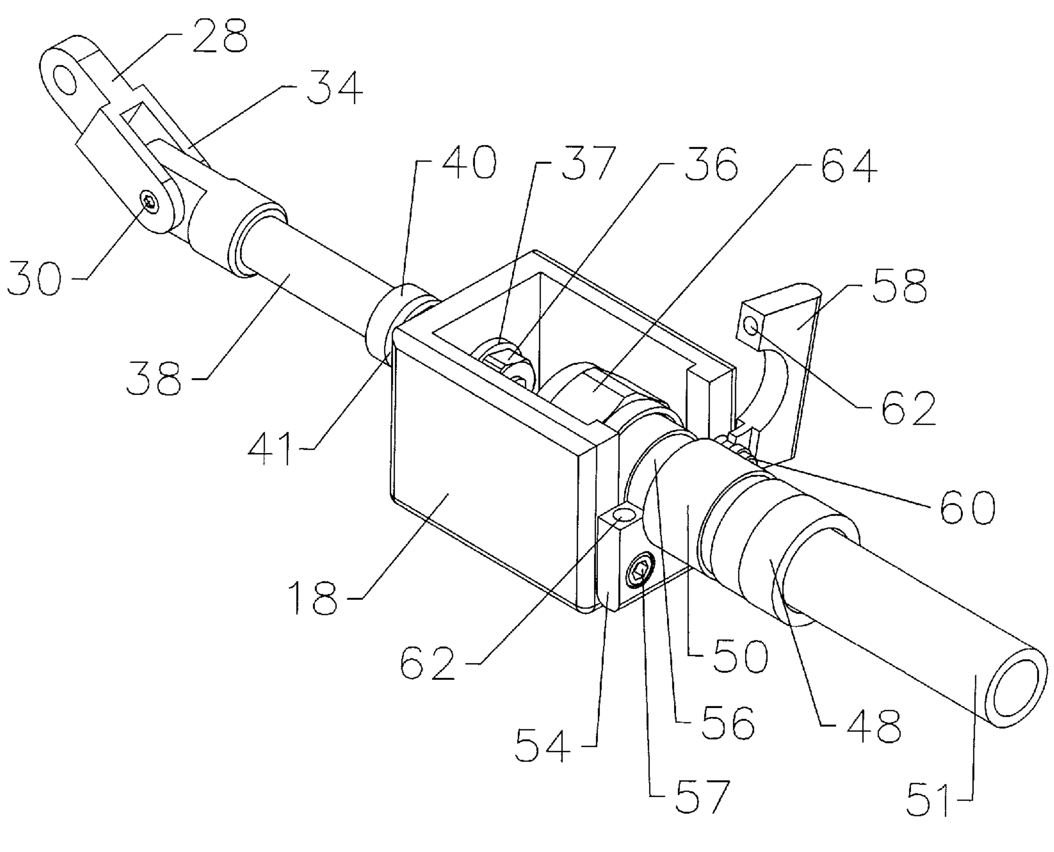
FIG. 3 is an enlarged, perspective view of a further embodiment of a push mechanism attached to a cradle with a connector/cable assembly in place, with the clamp arm opened for clarity.
Figure 4:
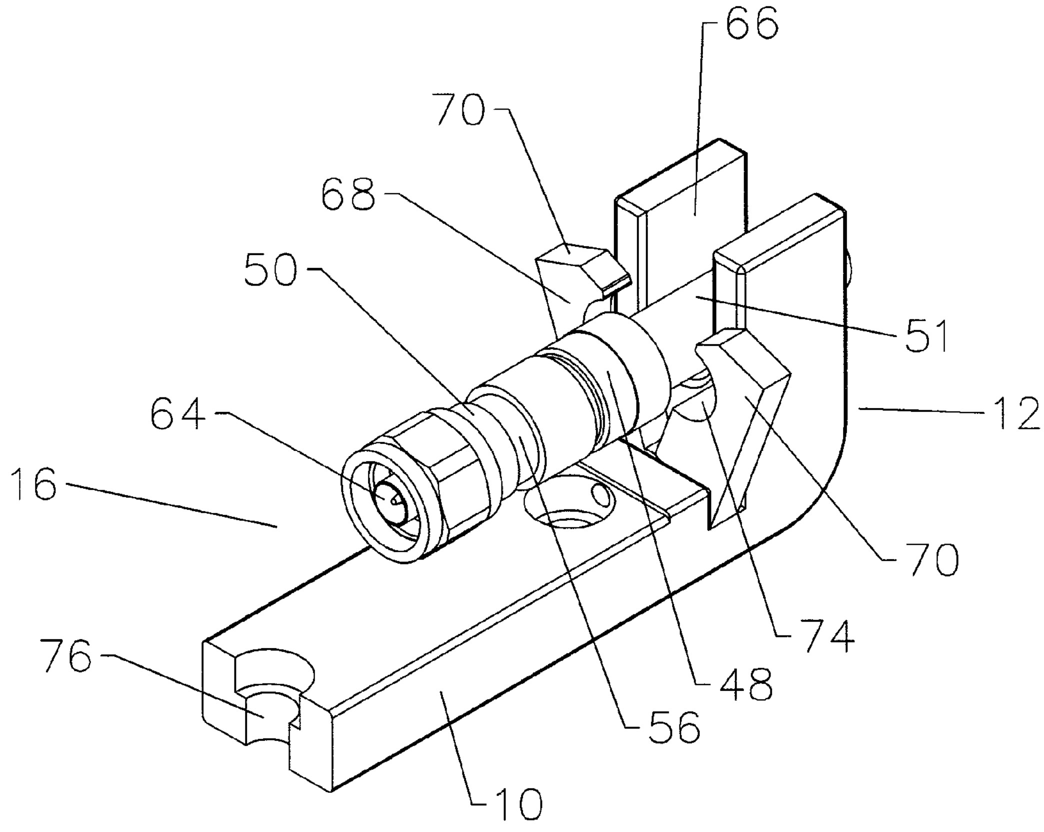
FIG. 4 is an enlarged, perspective view of a cable end portion of the axial compression tool showing a cable clamp, opened for clarity, with a connector/cable assembly in place.
Figure 5:
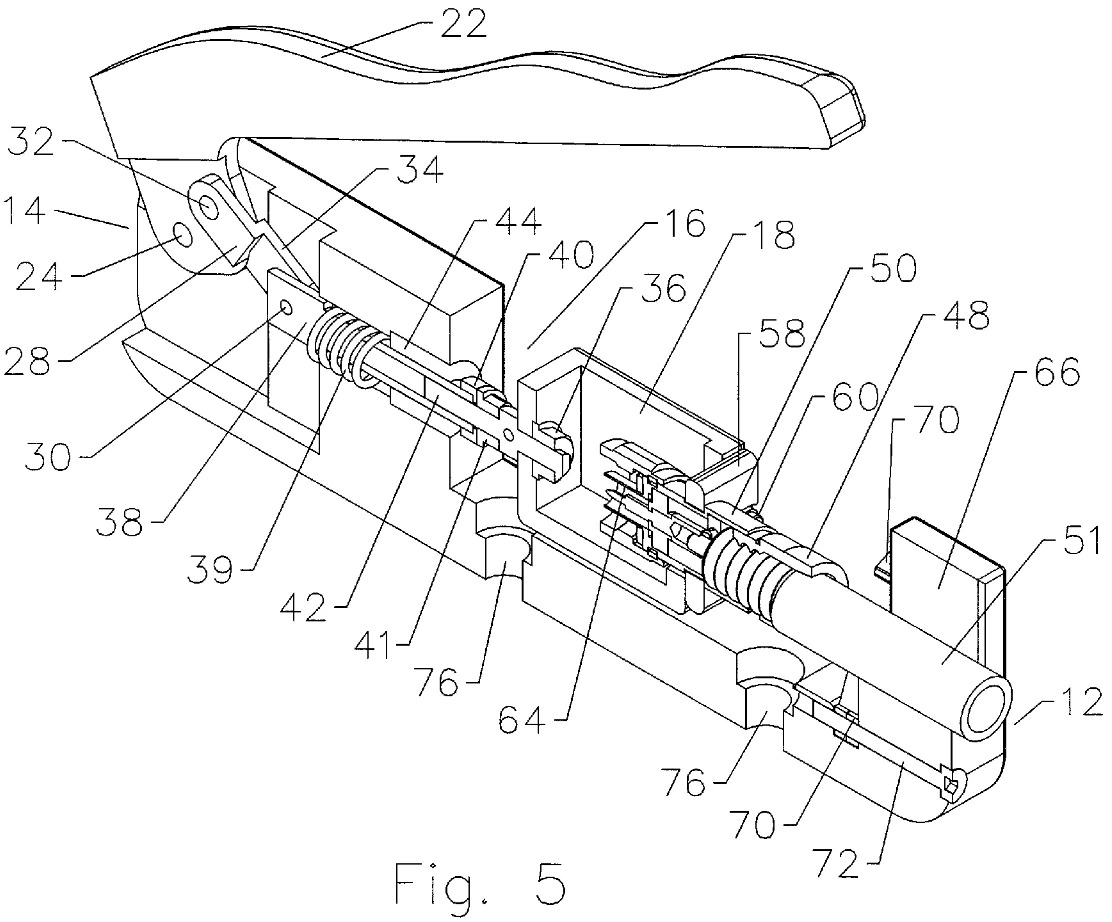
FIG. 5 is a cross-sectional, perspective view of the axial compression tool of FIG. 1 with a connector/cable assembly in place and the cable clamp opened for clarity.

The movement of the cradle 18 is managed by its connection to a lever mechanism 20 as shown, for example in FIG. 2. The lever mechanism 20 links a handle 22 to the body 10 via a handle axle 24. Pivotal movements of the handle 22 about the handle axle 24 actuate axial movements of the cradle 18 via, for example, a push shank 28 coupled at a lever end 14 to an offset area of the handle 22 by a support axle 32. A push axle 30 links the push shank 28 to the lever end 14 of the push mechanism 26. The cable end 12 of the push shank 28 may have, for example, a forked arm 34 to receive the push mechanism 26. The cable end 12 of the push mechanism 26 may be coupled to the cradle 18, for example by a cradle support nut 36 and a cradle washer 37 or the like. The cradle 18 is removably attached to permit interchangeability between different types of cradles 18.

The push mechanism 26 may comprise a push bar 38, a push spring 39, a stop 40, a push nut 41, and a key 42. The push mechanism 26 axially slides through the body 10 of the tool and is guided by, for example, a guide sleeve 44. The guide sleeve 44 slidably aligns the push mechanism 26 with the longitudinal axis of the tool. The push spring 39 biases the tool into an open position by pushing against the lever end 14 of the guide sleeve 44. On the cable end 12 of the push mechanism 26, the key 42 is inserted into a push aperture 46 formed in the cradle 18 and is fastened in place, for example, via the cradle support nut 36 and the cradle washer 37. The key 42 helps to prevent any rotational movements of the cradle 18 with respect to the push mechanism 26.

Electrical connectors adapted for use with this invention are disclosed, for example, in U.S. patent application Ser. No. 10/708,278. An axial compression of a connector to cable 51 interconnection is made, for example, to press fit a cable clamp sleeve 48 into a connector body 50, whereby an outer conductor of a cable 51 is coupled to the connector body 50. In use, the cable 51 and connector pair assembled for compression is placed into the cradle 18 with a cable clamp sleeve 48 of the connector body 50 mating with a shoulder clamp 54 removably attached to the cable end 12 of the cradle 18 by, for example, a plurality of shoulder clamp screws 57, as shown, for example, in FIGS. 2 and 3. Alternatively, the cable clamp sleeve may be formed integrated into the cable end 14 of the cradle 18. To more securely retain a compression shoulder 56 of the connector body 50 upon the shoulder clamp 54, a clamp arm 58 may be rotatably attached to the shoulder clamp 54, for example via a hinge axle 60. To retain the clamp arm 58 in a closed position, a contact 62 of the shoulder clamp 54 may include a magnetic contact, or the like. Alternatively, a mechanical clasp, latch, pin, spring, screw, or clip may be applied.

As shown in the exemplary embodiments, the cradle 18 may have the form of a box with the top and cable end 12 sides open. Alternatively, the cradle 18 may be formed as any structure that connects the push mechanism 26 to the shoulder clamp 54, such as a U-shaped bracket or the like. An open space between the lever end 14 and the cable end 12 of the selected cradle 18 configuration provides clearance for a variety of different connector interface(s) 64 such that when the connector is mounted upon the compression shoulder 56, axial compression forces applied by the tool are directed to the body 50 and not the connector interface 64.

The cable end 12 of the body 10 acts as a stop during compression of the cable clamp sleeve 48 into the connector body 50. A cable support 66 at the cable end 12 accommodates a cable clamp 68, as shown, for example, in FIG. 4. The cable clamp 68 may be removably attached to the cable support 66. The cable clamp 68, positioned on the lever end 14 of the cable support 66, may include two opposed movable arms 70. The movable arms 70 may pivot, spreadable apart and together, about a common axle 72. The movable arms 70 may be biased into a closed position via one or more bias spring(s) 73, or the like. Alternatively, a magnetic contact, a mechanical clasp, latch, pin, spring, screw, or clip may be used. A cable opening 74 formed by the movable arms 70 in the closed position is large enough to accept an outer diameter of the cable 51, but it is not able to pass the larger diameter of the cable clamp sleeve 48. The cable clamp 68 allows movement of a cable 51 through its cable opening 74 and through the cable support 66. During rotation of the handle 22, the shoulder clamp 54 and the cable clamp 68 advance toward one another to axially compress the connector body 50 and cable clamp sleeve 48 between them.

The tool is adaptable to connector families linked to a range of different cable 51 diameters via exchange of the shoulder clamp 54 and cable clamp 68 assemblies. Alternatively, the shoulder clamp 54 and the cable clamp 68 may, for example, slide into slots or snap into other forms of spring biased retainers formed in the cradle 18 and cable end 12 of the cavity 16, respectively. In simplified embodiments, the tool may be dedicated to a single cable 51 diameter and connector interface 64 by permanently attaching and or integrating the shoulder clamp 54 into the cradle 18. Similarly, the cable clamp 68 may be integrated with the cable support 66.

The body 10 also may include mounting hole(s) 76 for removably attaching the tool to a desired surface, such as a workbench. As shown, for example, in FIG. 5, one or more mounting hole(s) 76 may be located in the cavity 16 and or the body 10, counter sunk to avoid interference with the axial movements of the cradle 18.

From the foregoing, one skilled in the art will appreciate that the invention provides a single cost effective tool to axially compress connectors having any of a wide range of different connector interfaces 64 to cables 51 without damaging the connector interface 64 and or the inner workings of each connector.

Table of Parts

| | |
|---|---|
| 10 | body |
| 12 | cable end |
| 14 | lever end |
| 16 | cavity |
| 18 | cradle |
| 20 | lever mechanism |
| 22 | handle |
| 24 | handle axle |
| 26 | push mechanism |
| 28 | push shank |
| 30 | push axle |
| 32 | support axle |
| 34 | forked arm |
| 36 | cradle support nut |
| 37 | cradle washer |
| 38 | push bar |
| 39 | push spring |
| 40 | stop |
| 41 | push nut |
| 42 | key |
| 44 | guide sleeve |
| 46 | push aperture |
| 48 | cable clamp sleeve |
| 50 | connector body |
| 51 | cable |
| 54 | shoulder clamp |
| 56 | compression shoulder |
| 57 | shoulder clamp screw |
| 58 | clamp arm |
| 60 | hinge axle |
| 62 | contact |
| 64 | connector interface |
| 66 | cable support |
| 68 | cable clamp |
| 70 | movable arm |
| 72 | common axle |
| 73 | bias spring |
| 74 | cable opening |
| 76 | mounting hole |

Where in the foregoing description reference has been made to ratios, integers, components or modules having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

The invention claimed is:

1. A connector axial compression tool having a lever end and a cable end, comprising:

a body;

a cable clamp coupled to the cable end of a cavity formed in the body;

a cradle slidably mounted within the cavity supporting a shoulder clamp;

a lever mechanism coupled to the cradle and slidably mounted through the body; and a handle pivotally attached to the body and the lever mechanism operable to actuate axial movements of the cradle.

2. The apparatus of claim 1, wherein the cable clamp is removably attached.

3. The apparatus of claim 1, wherein the cable clamp is biased into a closed position.

4. The apparatus of claim 3, wherein the cable clamp is biased into a closed position by a spring.

5. The apparatus of claim 1, wherein the cradle has the form of a box with an open side.

6. The apparatus of claim 1, wherein the cradle has the form of a U-shaped bracket.

7. The apparatus of claim 1, wherein the cradle is removably attached to the cable end of the lever mechanism.

8. The apparatus of claim 1, wherein the shoulder clamp is retained by slots formed in the cradle.

9. The apparatus of claim 1, wherein the shoulder clamp is removably attached to the cable end of the cradle.

10. The apparatus of claim 1, wherein the shoulder clamp is formed in the cable end of the cradle.

11. The apparatus of claim 1, further including a clamp arm hingeably attached to the shoulder clamp.

12. The apparatus of claim 11, wherein the shoulder clamp and the clamp arm are retainable in a closed position by a magnetic contact.

13. The apparatus of claim 11, wherein the shoulder clamp and the clamp arm are retainable in a closed position by one of a clasp, a latch, a pin, a spring, a screw, and a clip.

14. The apparatus of claim 1, further including a mounting hole in the body for mounting the compression tool to a desired surface.

15. The apparatus of claim 1, wherein the cable clamp is adapted to abut the cable end of a cable clamp sleeve of the connector.

16. The apparatus of claim 1, wherein the cable clamp forms an inner diameter that is less than a cable clamp sleeve diameter of the connector and greater than a cable diameter.

17. The apparatus of claim 1, wherein the shoulder clamp is adapted to retain a compression shoulder of the connector.

18. A connector axial compression tool having a lever end and a cable end, comprising:

a body;

a cable clamp having an inner diameter that is less than a cable clamp sleeve diameter of the connector and greater than a cable diameter coupled to the cable end of a cavity formed in the body;

a cradle slidably mounted within the cavity supporting a shoulder clamp;

a lever mechanism coupled to the cradle and slidably mounted through the body;

a handle pivotally attached to the body and the lever mechanism operable to actuate axial movements of the cradle;

a clamp arm hingeably attached to the shoulder clamp;

a magnetic contact adapted to retain the shoulder clamp and the clamp arm in a closed position; and a mounting hole in the body for mounting the compression tool to a desired surface;

the cradle adapted to support a connector body of the connector without interference with a connector interface of the connector.

* * * * *